US012566100B2

(12) United States Patent
Bae et al.

(10) Patent No.: US 12,566,100 B2
(45) Date of Patent: Mar. 3, 2026

(54) METHOD AND EQUIPMENT FOR LEAKAGE TESTING OF ELECTROSTATIC CHUCK

(71) Applicant: SEMES CO., LTD., Cheonan-si (KR)

(72) Inventors: Da-Som Bae, Seoul (KR); Kyeong Hee Kang, Hwaseong-si (KR); Young Ran Ko, Daegu (KR); Mi Young Jo, Hwaseong-si (KR)

(73) Assignee: Semes Co., LTD., Cheonan-si (KR)

( * ) Notice: Subject to any disclaimer, the term of this patent is extended or adjusted under 35 U.S.C. 154(b) by 416 days.

(21) Appl. No.: 18/147,308

(22) Filed: Dec. 28, 2022

(65) Prior Publication Data

US 2023/0204448 A1     Jun. 29, 2023

(30) Foreign Application Priority Data

Dec. 28, 2021 (KR) ........................ 10-2021-0190318

(51) Int. Cl.
*G01M 3/20* (2006.01)

(52) U.S. Cl.
CPC ..................................... *G01M 3/20* (2013.01)

(58) Field of Classification Search
CPC .......... G01M 3/20; G01M 3/002; G01M 3/38; G01J 5/48; G03B 39/00; H01L 21/67242; H01L 21/6831
See application file for complete search history.

(56) References Cited

U.S. PATENT DOCUMENTS

| | | | | |
|---|---|---|---|---|
| 8,205,483 | B1 * | 6/2012 | Peterson ............ | B01D 53/0454 |
| | | | | 73/38 |
| 2014/0362226 | A1 * | 12/2014 | Xu ........................ | G01M 3/223 |
| | | | | 348/164 |
| 2019/0198299 | A1 * | 6/2019 | Watanabe ......... | H01L 21/67115 |
| 2023/0141451 | A1 * | 5/2023 | Benjamin ............... | G01M 3/38 |
| | | | | 73/40 |

FOREIGN PATENT DOCUMENTS

| | | |
|---|---|---|
| CN | 109724753 A | 5/2019 |
| JP | 10176971 | 6/1986 |

(Continued)

OTHER PUBLICATIONS

English machine translation of Hwang, KR 200244641, translated online Feb. 2025 (Year: 2001).*

(Continued)

*Primary Examiner* — David Z Huang
(74) *Attorney, Agent, or Firm* — Harness, Dickey & Pierce, P.L.C.

(57) ABSTRACT

The present invention provides a method for leakage testing of an electrostatic chuck. The method for leakage testing of an electrostatic chuck comprises: a mounting step of mounting the electrostatic chuck on a test stage of a testing chamber; a loading step of loading a dummy substrate in an upper surface of the electrostatic chuck; a decompression step of decompressing an interior of the testing chamber; a tracking fluid supply step of supplying a tracking fluid with visibility to a flow path of the electrostatic chuck; a photo- (Continued)

graphing step of photographing the electrostatic chuck; and a determination step of determining whether a leakage occurs in the flow path by examining an image photographed in the photographing step.

8 Claims, 4 Drawing Sheets

(56)                    References Cited

FOREIGN PATENT DOCUMENTS

| | | | | |
|---|---|---|---|---|
| JP | H10176971 | A | * | 6/1998 |
| JP | 2001004480 | A | | 1/2001 |
| JP | 2011179975 | A | | 9/2011 |
| JP | 4899313 | B2 | | 3/2012 |
| KR | 200244641 | Y1 | | 10/2001 |
| KR | 100572700 | B1 | | 4/2006 |
| KR | 101257481 | B1 | | 4/2013 |

OTHER PUBLICATIONS

English Machine Translation of JP H10176971 A (Year: 1998).*
Office Action for Korean Application No. 10-2021-0190318 dated Feb. 23, 2024.
Chinese Office Action issued May 24, 2025 in Chinese Patent Application No. 202211698423.6.

* cited by examiner

METHOD AND EQUIPMENT FOR LEAKAGE TESTING OF ELECTROSTATIC CHUCK

CROSS-REFERENCE TO RELATED APPLICATIONS

This application claims priority to and the benefit of Korean Patent Application No. 10-2021-0190318 filed in the Korean Intellectual Property Office on Dec. 28, 2021, the entire contents of which are incorporated herein by reference.

TECHNICAL FIELD

The present invention relates to a method and equipment for leakage testing of an electrostatic chuck, and more particularly, to a method and equipment for leakage testing of an electrostatic chuck by using a tracking fluid with visibility.

BACKGROUND ART

In the semiconductor field, a chemical vapor deposition (CVD) method is widely used, and is a process that does not allow the intervention of impurities because deposited materials on a wafer form a pattern or function as a film. Further, an etching process of processing only necessary parts of the wafer in a rust resisting way and then removing unnecessary parts thereof is performed, and to this end, an electrostatic chuck is used.

Such an electrostatic chuck has a cooling structure of cooling the substrate using helium gas. The cooling structure forms a groove in an upper surface of the electrostatic chuck, which is a passage of the helium gas, and allows the helium gas to flow to the groove in the upper surface of the electrostatic chuck when the substrate is placed on the upper surface of the electrostatic chuck, thus cooling the substrate and the electrostatic chuck. The helium gas is a cooling gas that maintains a constant temperature of the electrostatic chuck and the substrate, and leakage of the helium gas is a major factor that determines the life cycle of the electrostatic chuck.

FIG. 1 is a view for explaining equipment for leakage testing of helium gas of a conventional electrostatic chuck.

In the equipment for leakage testing illustrated in FIG. 1, only the occurrence of helium leakage of an electrostatic chuck 20 can be checked using a method of sensing a helium leakage by detecting a pressure change per hour after forming a vacuum inside a chamber 1. Accordingly, there is a problem in that it is difficult to determine which part of the electrostatic chuck 20 is problematic.

SUMMARY OF THE INVENTION

The present invention has been made in an effort to provide a method and equipment for leakage testing of an electrostatic chuck which can specify a leakage area of the electrostatic chuck.

The object of the present invention is not limited thereto, and other objects not mentioned will be clearly understood by those of ordinary skill in the art from the following description.

An exemplary embodiment of the present invention provides equipment for leakage testing of a test object, including: a testing chamber providing an inner space in which the test object is placed; a tracking fluid supply portion configured to supply a tracking fluid with visibility to a flow path of the test object; and a photographing portion configured to photograph the test object disposed in the testing chamber.

According to the exemplary embodiment, the equipment for leakage testing of a test object may further include a determination portion configured to determine whether a leakage occurs in the flow path by examining an image photographed by the photographing portion.

According to the exemplary embodiment, the tracking fluid supply portion may supply the tracking fluid in the form of droplets.

According to the exemplary embodiment, the tracking fluid supply portion may supply the tracking fluid at high temperature and high pressure.

According to the exemplary embodiment, the testing chamber may be provided in a light-blocking form.

According to the exemplary embodiment, the testing chamber may have a perspective window for photographing of the photographing portion formed on one side thereof.

According to the exemplary embodiment, the photographing portion may include a high-speed camera configured to photograph the tracking fluid leaking from the test object.

According to the exemplary embodiment, the photographing portion may include a thermal imaging camera configured to photograph the tracking fluid leaking from the test object.

According to the exemplary embodiment, the tracking fluid may include a pigment or a fluorescent material.

According to the exemplary embodiment, the equipment for leakage testing of a test object may further include a depressurizing member for decompressing the testing chamber.

Another exemplary embodiment of the present invention provides a method for leakage testing of an electrostatic chuck, including: a mounting step of mounting the electrostatic chuck on a test stage of a testing chamber; a loading step of loading a dummy substrate in an upper surface of the electrostatic chuck; a decompression step of decompressing an interior of the testing chamber; a tracking fluid supply step of supplying a tracking fluid with visibility to a flow path of the electrostatic chuck; a photographing step of photographing the electrostatic chuck; and a determination step of determining whether a leakage occurs in the flow path by examining an image photographed in the photographing step.

According to the exemplary embodiment, in the tracking fluid supply step, the tracking fluid may be supplied in the form of droplets.

According to the exemplary embodiment, in the tracking fluid supply step, the tracking fluid may be supplied at high temperature and high pressure.

According to the exemplary embodiment, the photographing step may be performed in a state of shielding the testing chamber.

According to the exemplary embodiment, in the photographing step, the tracking fluid leaking from the flow path of the electrostatic chuck may be photographed by a high-speed camera.

According to the exemplary embodiment, the tracking fluid leaking from the flow path of the electrostatic chuck may be photographed by a thermal imaging camera.

According to the exemplary embodiment, the tracking fluid may include a pigment or a fluorescent material.

According to the exemplary embodiment, the tracking fluid supply step may be performed in a state in which a dummy substrate adheres to an upper surface of the electrostatic chuck by supplying a DC voltage of a power supply unit to the electrostatic chuck.

Still another exemplary embodiment of the present invention provides a method for leakage testing of an electrostatic chuck including: a mounting step of mounting the electrostatic chuck on a test stage of a testing chamber; a loading step of loading a dummy substrate in an upper surface of the electrostatic chuck; a decompression step of decompressing an interior of the testing chamber; a tracking fluid supply step of supplying a tracking fluid with visibility to a flow path of the electrostatic chuck; a photographing step of photographing the electrostatic chuck; and a determination step of determining whether a leakage occurs in the flow path by examining an image photographed in the photographing step, and the tracking fluid supply step is performed in a state in which a dummy substrate adheres to an upper surface of the electrostatic chuck by supplying a DC voltage of a power supply unit to the electrostatic chuck, and the tracking fluid includes a pigment or a fluorescent material.

According to the exemplary embodiment, in the tracking fluid supply step, the tracking fluid may be supplied at high temperature and high pressure, and in the photographing step, the tracking fluid leaking from the electrostatic chuck flow path may be photographed using at least one of a high-speed camera, a thermal imaging camera, and an infrared camera.

According to the exemplary embodiment of the invention, a tracking fluid with visibility is supplied to an electrostatic chuck instead of helium gas, and since a camera photographs the electrostatic chuck, a remarkable effect of specifying a leakage area can be expected.

According to the exemplary embodiment of the invention, by specifying the leakage area of the electrostatic chuck in the equipment for leakage testing, it is possible to determine a repattern, cleaning, and disposal of the electrostatic chuck through a precise analysis.

The effect of the present invention is not limited to the foregoing effects, and the not-mentioned effects will be clearly understood by those skilled in the art from the present specification and the accompanying drawings.

DETAILED DESCRIPTION

Figure 1:
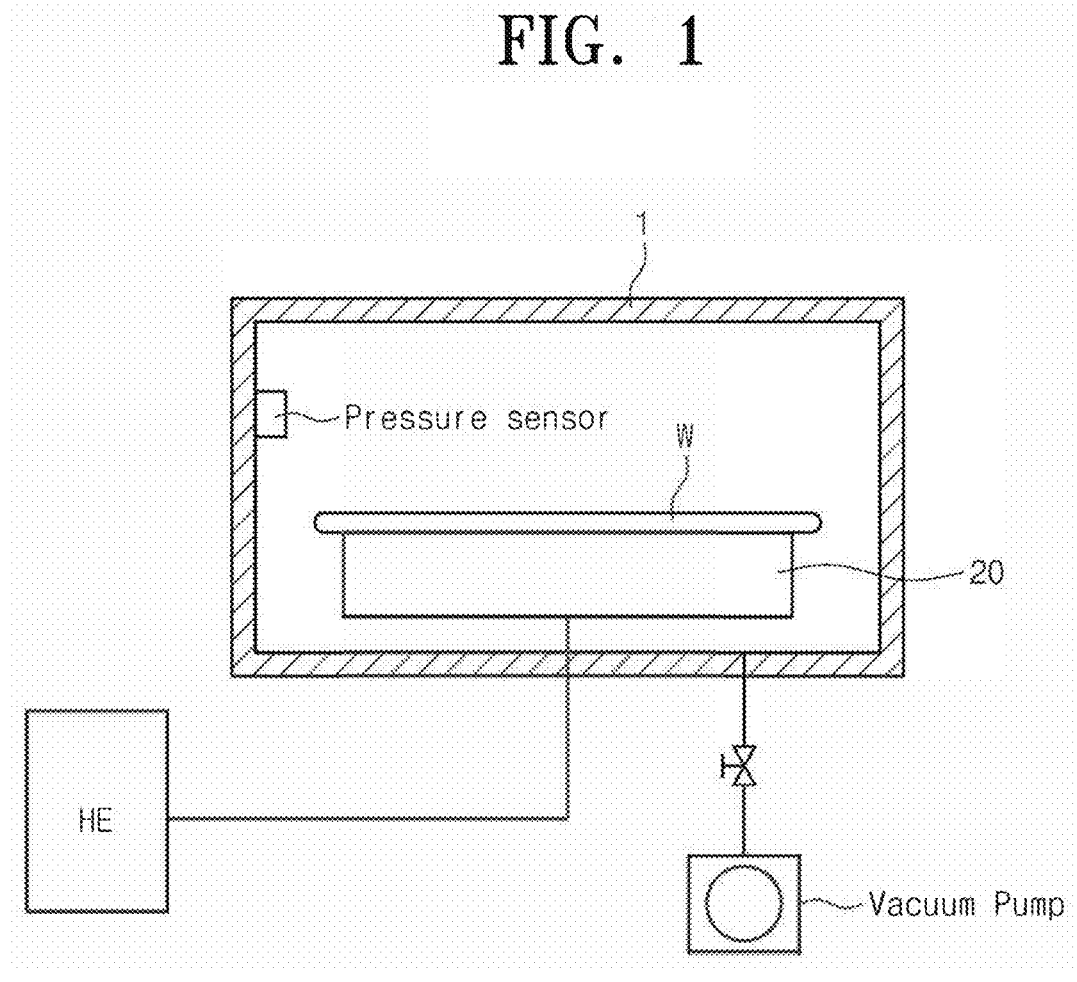
FIG. 1 is a view for explaining equipment for leakage testing of helium gas of a conventional electrostatic chuck.

Hereinafter, an exemplary embodiment of the present invention will be described in detail with reference to the accompanying drawings so that those skilled in the technical field to which the present invention pertains may easily carry out the exemplary embodiment. However, the present invention may be implemented in various different ways, and is not limited to exemplary embodiments described herein. In describing the present invention, a detailed description of known functions and configurations will be omitted when it may obscure the subject matter of the present invention. Like numbers refer to like elements throughout the description of the figures.

Unless explicitly stated to the contrary, the word "comprise," "comprises" or "comprising" used throughout the specification will not be understood as the exclusion of the other elements but to imply the inclusion of the other elements. Specifically, the term "include," "comprise," "including," or "comprising," specifies a property, a region, a fixed number, a process, an element and/or a component hut does not exclude other properties, regions, fixed numbers, processes, elements and/or components.

In this specification, the singular also includes the plural unless specifically stated otherwise in the phrase. In the drawings, the shapes and dimensions of elements may be exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The foregoing detailed description illustrates the present disclosure. Also, the foregoing is intended to illustrate and explain the preferred embodiments of the present disclosure, and the present disclosure may be used in various other combinations, modifications, and environments. That is, it is possible to make changes or modifications within the scope of the concept of the above-described disclosure, within an equivalent scope to the above-described disclosure, and/or within the skill or knowledge of the art. The above-described embodiments illustrate the best mode for carrying out the technical idea of the present disclosure, and various modifications may be made in the specific applications and uses of the present disclosure. Therefore, the detailed description of the present disclosure is not intended to limit the present disclosure to the disclosed embodiments. It is also to be understood that the appended claims are construed to cover further embodiments.

Figure 2:
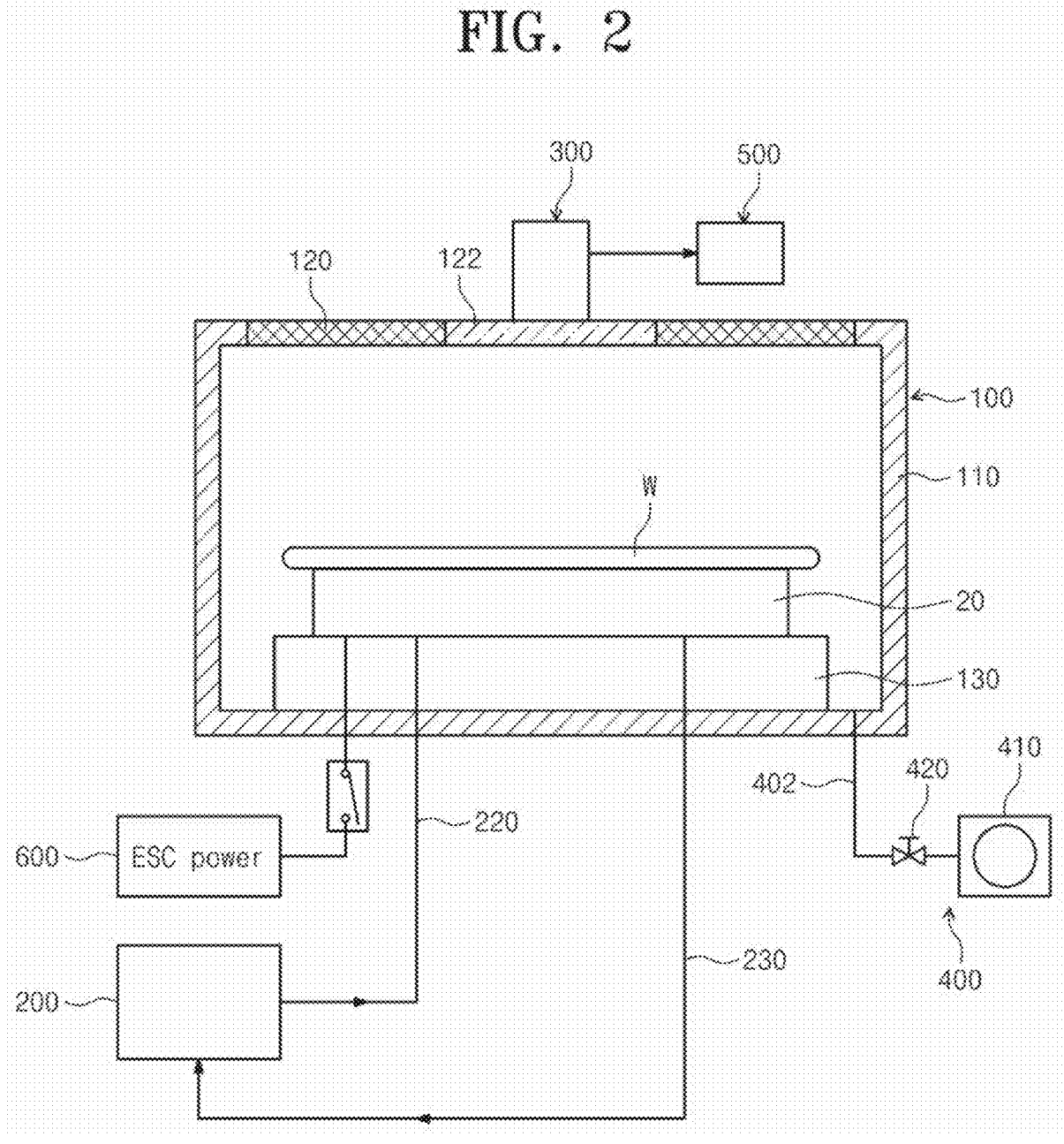
FIG. 2 is a view illustrating the equipment for leakage testing of an electrostatic chuck according to one embodiment of the present invention.
Figure 3:
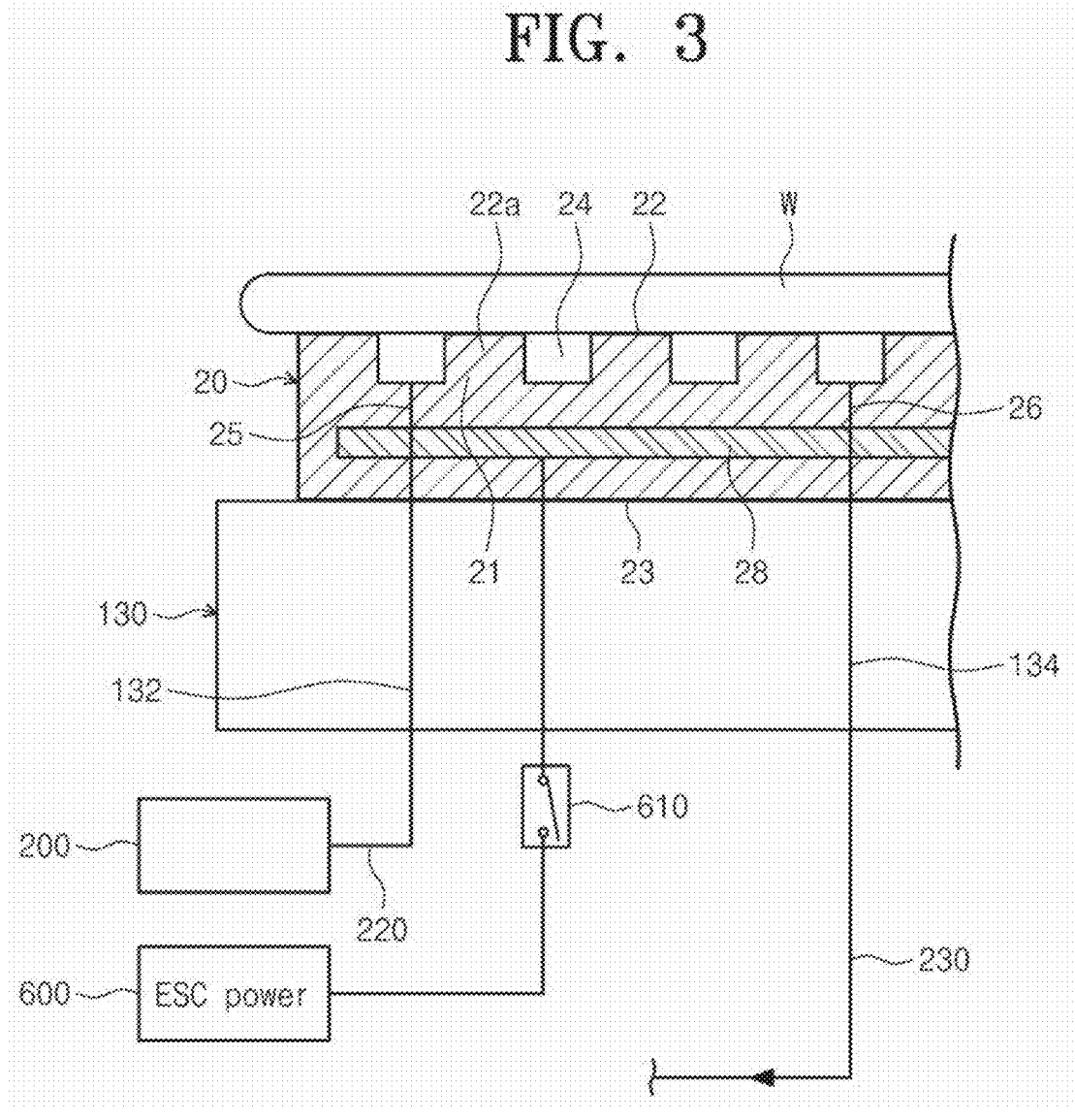
FIG. 3 is an enlarged cross-sectional view of a main part for explaining the electrostatic chuck illustrated in FIG. 2.

FIG. 2 is a view illustrating the equipment for leakage testing of an electrostatic chuck according to one embodiment of the present invention, and FIG. 3 is an enlarged cross-sectional view of a main part for explaining the electrostatic chuck illustrated in FIG. 2.

The equipment for leakage testing of an electrostatic chuck of the present invention is a device for testing the presence or absence of a helium leakage before the electrostatic chuck is applied to mass production.

Referring to FIGS. 2 and 3, the equipment 10 for leakage testing may include a testing chamber 100, a tracking fluid supply portion 200, a photographing portion 300, a decompressing member 400, and a determination portion 500.

The testing chamber 100 provides an inner space in which the electrostatic chuck 20 to be tested is placed. The testing chamber 100 may be a vacuum chamber. The decompressing member 400 may be connected to the testing chamber such that the inner space is made in a vacuum state. The decompressing member 400 may include a pumping line 402 provided with a vacuum pump 410 and an opening/closing valve 420.

In addition, the testing chamber may be a light-shielding chamber. A stage 130 on which the electrostatic chuck 20 is mounted may be provided in the testing chamber 100.

The stage 130 may be provided with a supply flow path 132 for supplying a tracking fluid to the electrostatic chuck 20, and a discharge flow path 134 through which the tracking fluid is discharged from the electrostatic chuck 20. The supply flow path 132 may be connected to a supply line 220 of the tracking fluid supply portion 200, and the discharge flow path 134 may be connected to a tracking fluid recovery line 230. When the electrostatic chuck 20 is mounted in the stage 130, the supply flow path 132 may be connected to the first flow path 25 of the electrostatic chuck, and the discharge flow path 134 may be connected to the second flow path 26 of the electrostatic chuck.

The electrostatic chuck 20 may include a ceramic dielectric body 21 and an electrode 28. The ceramic dielectric body 21 is, for example, a flat substrate formed by a polycrystalline ceramic sintered body, and has an upper surface 22 that loads a treating object such as a semiconductor wafer, etc., and a bottom surface 23 opposite to the upper surface 22. In the present invention, a dummy substrate W is used to test helium leakage of the electrostatic chuck. The electrode 28 is provided between the upper surface 22 and the bottom surface 23 of the ceramic dielectric body 21. That is, the electrode 28 may be formed to be inserted into the ceramic dielectric body 21. The electrode 28 is integrally sintered to the ceramic dielectric body 21. The electrostatic chuck 20 generates electric charges on the upper surface 22 of the electrode 28 by applying an adhering maintenance voltage to the electrode 28, and adhering and maintains the substrate W (i.e., the dummy substrate) to be treated by an electrostatic force. For example, when the electrostatic chuck 20 is mounted in the stage, the electrode 28 may be electrically connected to a power supply unit 600. The power supply unit 600 includes DC power. A switch 610 is installed between the electrode 28 and a power supply unit 60a. The electrode 28 may be electrically connected to the power supply unit 600 by turning on/off the switch 610. When the switch 610 is turned on, a DC current is applied to the electrode 28. The electrostatic force is exerted between the electrode 28 and the dummy substrate W by the current applied to the electrode 28, and the dummy substrate W is fixed to an upper surface of the electrostatic chuck by the electrostatic force.

Meanwhile, a convex portion 22a is formed on the upper surface 22 of the electrostatic chuck, and a groove 24 is formed between the convex portions 22a. The groove 24 is in communication, and a space is formed between a rear surface of the dummy substrate mounted in the electrostatic chuck 20 and the groove 24. A first flow path 25 is connected to the groove 24. When the tracking fluid is introduced from the first flow path 25 while adhering and maintaining the dummy substrate W, the tracking fluid flows in the space formed between the dummy substrate W and the groove 24, and the tracking fluid is discharged through the second flow path 26.

Referring back to FIG. 1, the testing chamber 100 may include a chamber body 110 with a side surface and a bottom surface, and a cover 120 that covers an opened upper surface of the chamber body 110. The photographing portion 300 may be installed on the cover 120. The cover 120 may include a transparent window 122. The photographing portion 300 may photograph the electrostatic chuck 20 mounted in the stage 130 through the window 122. The window 122 may be provided only in a part of the cover 120 for the purpose of photographing the photographing portion 300.

The tracking fluid supply portion 200 supplies a tracking fluid with visibility to the electrostatic chuck 20. The tracking fluid supply portion 200 includes a supply line 220 and a recovery line 230. The supply line 220 and the recovery line 230 are connected to the supply flow path 132 and the discharge flow path 134 of the stage 130. The tracking fluid supply portion 200 may supply the tracking fluid to the electrostatic chuck in the form of droplets. In addition, the tracking fluid supply portion 200 may supply the tracking fluid to the electrostatic chuck 20 in high temperature and high pressure. Although not illustrated, the tracking fluid supply portion 200 may include a heater and a compressor. The tracking fluid may include at least one of a pigment and a fluorescent material, but the present invention is not limited thereto, and the tracking fluid may include a component having visibility.

The photographing portion 300 photographs the electrostatic chuck 20 mounted on the stage 130 of the testing chamber 100 and a periphery thereof. The photographing portion 300 may include a camera. The camera may vary according to the characteristics of the tracking fluid supplied to the electrostatic chuck 20. For example, the photographing portion 300 may include a high-speed camera for photographing the tracking fluid leaking from the electrostatic chuck 20. For another example, the photographing portion 300 may include a thermal imaging camera for photographing the tracking fluid leaking from the electrostatic chuck 20. The photographing portion 300 may include both a high-speed camera and a thermal image camera.

The determination portion 500 may determine whether there is a leakage between the electrostatic chuck 20 and the dummy substrate W by examining an image photographed by the photographing portion 300.

The equipment 10 for leakage testing of the present invention can specify a leakage area by supplying the tracking fluid with visibility to the electrostatic chuck 20 instead of helium gas and photographing the tracking fluid with the camera. Therefore, since the equipment 10 for leakage testing specifies the leakage area of the electrostatic chuck 20, it is possible to determine a repattern, cleaning, and disposal of the electrostatic chuck through a precise analysis.

Figure 4:
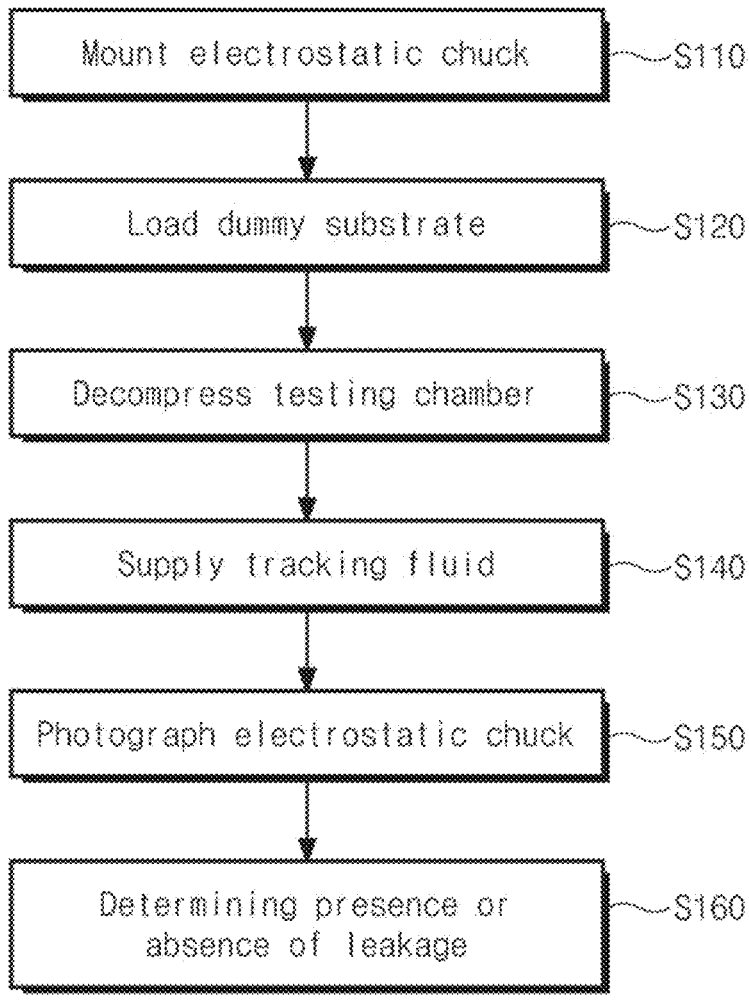
FIG. 4 is a flowchart illustrating a method for leakage testing according to one embodiment of the present invention.

FIG. 4 is a flowchart illustrating a method for leakage testing according to one embodiment of the present invention.

Referring to FIGS. 2 to 4, the method for leakage testing of the electrostatic chuck may include an electrostatic chuck mounting step S110, a dummy substrate loading step S120, a chamber decompression step S130, a tracking fluid supply step S140, an electrostatic chuck photographing step S150, and a leakage determination step S160.

(Electrostatic Chuck Mounting Step S110) The electrostatic chuck 20 to be tested is mounted in the testing stage 130 of the testing chamber 100. When the electrostatic chuck 20 is mounted in the testing stage 130, the supply flow path 132 may be connected to the first flow path 25 of the electrostatic chuck, and the discharge flow path 134 may be connected to the second flow path 26 of the electrostatic chuck 20. In addition, when the electrostatic chuck 20 is mounted in the testing stage 130, the electrode 28 may be electrically connected to the power supply unit 600.

(Dummy Substrate Loading Step S120) When the electrostatic chuck 20 is completely mounted in the testing stage 130, the dummy substrate W is loaded on the upper surface 22 of the electrostatic chuck 20. Furthermore, as the switch 610 is turned on, the DC current is applied to the electrode 28. The electrostatic force is exerted between the electrode 28 and the dummy substrate W by the current applied to the electrode 28, and the dummy substrate W is fixed to the upper surface of the electrostatic chuck 20 by the electrostatic force.

(Chamber Decompression Step S130) The inner space of the testing chamber is vacuumed by the decompression member 400.

(Tracking Fluid Supply Step S140) The tracking fluid supply portion 200 supplies the tracking fluid to the electrostatic chuck 20 in a state in which the inner space of the testing chamber 100 is vacuumed by the decompression member 400. The tracking fluid flows into a space formed between the dummy substrate W and the groove 24. In this process, if the upper surface of the electrostatic chuck is contaminated or a flatness thereof is twisted, the tracking fluid may leak between a bottom surface of the dummy substrate W and the upper surface 22 of the electrostatic chuck 20 because the bottom surface of the dummy substrate W is not in close contact with the upper surface 22 of the electrostatic chuck 20. When the electrostatic chuck is a normal product, no leakage of the tracking fluid occurs.

(Electrostatic Chuck Photographing Step S150) The photographing portion 300 photographs the electrostatic chuck 20 mounted in the stage 130 of the testing chamber 100 and the periphery thereof. In this case, the tracking fluid leaking between the dummy substrate W and the electrostatic chuck 20 may be photographed by the photographing portion 300.

(Leakage Determination Step S160) The determination portion 500 may determine whether the leakage occurs between the electrostatic chuck 20 and the dummy substrate W by examining the presence or absence and a distribution of the tracking fluid in the image photographed by the photographing portion 300 and confirm the leakage area.

The leakage of the electrostatic chuck 200 can be tested through the configuration and process, thereby ensuring accurate leakage testing of the electrostatic chuck 200. Specifically, since the tracking fluid with visibility is supplied to the electrostatic chuck, the leakage area may be specified.

In the above-mentioned exemplary system, although the methods have described based on a flow chart as a series of steps or blocks, the present invention is not limited to a sequence of steps but any step may be generated in a different sequence or simultaneously from or with other steps as described above. Moreover, one skilled in the art would understand that the steps illustrated in the flow diagram are not exclusive and other steps may be included or one or more of the steps in the example flow diagram may be deleted without affecting the scope and spirit of the present disclosure.

It is noted that the above embodiments are suggested for understanding of the present invention and do not limit the scope of the present invention, and various modifiable embodiments also fall within the scope of the present invention. It should be understood that the technical protection range of the present invention has to be determined by the technical spirit of the claims, and the technical protection range of the present invention is not limited to the lexical meaning of the claims but reaches even to the equivalent inventions.

What is claimed is:

1. Equipment for leakage testing of a test object, comprising:

a testing chamber providing an inner space in which the test object is placed;

a tracking fluid supply portion configured to supply a tracking fluid with visibility to a flow path of the test object; and a photographing portion configured to photograph the test object disposed in the testing chamber, wherein the test object is an electrostatic chuck configured to support a substrate, wherein the electrostatic chuck includes:

an upper surface having grooves formed thereon;

a first flow path configured to supply a fluid to the grooves; and a second flow path configured to discharge the fluid from the grooves;

wherein the grooves, when covered by a lower surface of the substrate supported on the upper surface, form a channel fluidly connecting the first flow path and the second flow path; and a determination portion configured to determine whether a leakage occurs in the flow path by examining an image photographed by the photographing portion, the tracking fluid supply portion being configured to supply the tracking fluid as a heated and pressurized fluid.

2. The equipment of claim 1, wherein the tracking fluid supply portion supplies the tracking fluid in the form of droplets.

3. The equipment of claim 1, wherein the testing chamber is provided in a light-blocking form.

4. The equipment of claim 3, wherein the testing chamber has a transparent window for photographing of the photographing portion formed on one side thereof.

5. The equipment of claim 1, wherein the photographing portion includes a high-speed camera configured to photograph the tracking fluid leaking from the test object.

6. The equipment of claim 1, wherein the photographing portion includes a thermal imaging camera configured to photograph the tracking fluid leaking from the test object.

7. The equipment of claim 5, wherein the tracking fluid includes a pigment or a fluorescent material.

8. The equipment of claim 1, further comprising a depressurizing member for decompressing the testing chamber.

* * * * *